June 17, 1941. J. I. GODSHALK 2,246,247
ADJUSTABLE FASTENER FOR RAINSPOUT HANGERS
Filed July 9, 1940
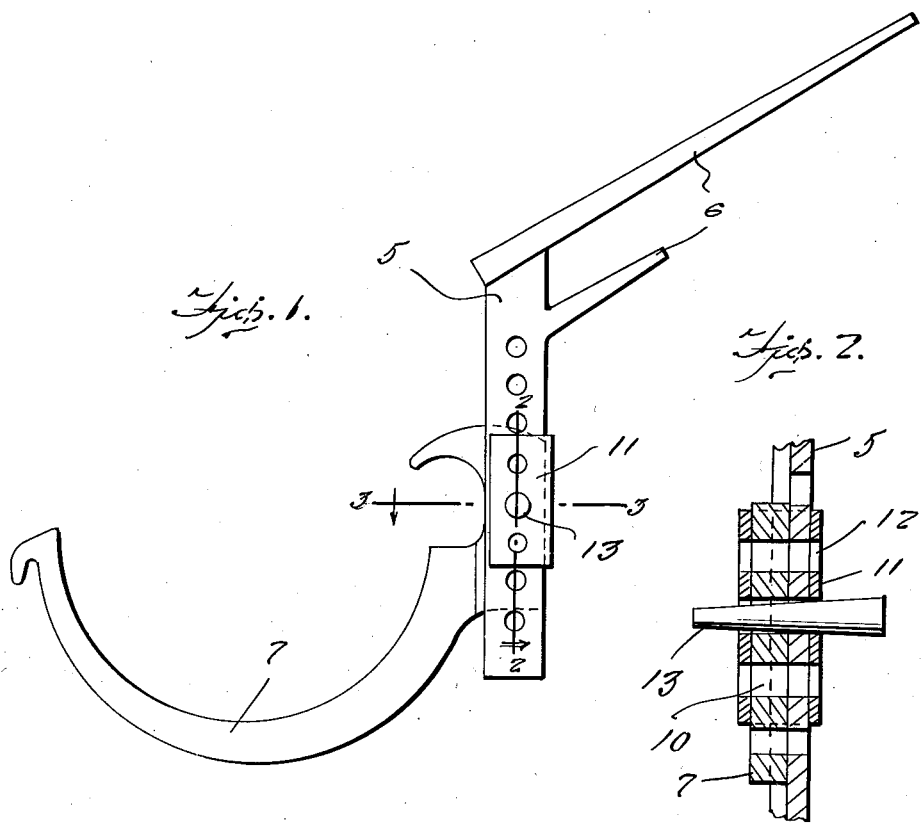
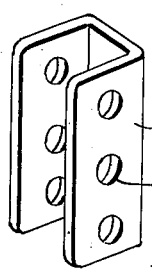
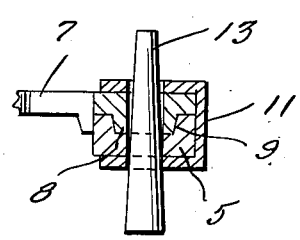
Inventor
JOHN I. GODSHALK
By Clarence A. O'Brien
Attorney Patented June 17, 1941

2,246,247

UNITED STATES PATENT OFFICE 2,246,247

ADJUSTABLE FASTENER FOR RAINSPOUT HANGERS

John I. Godshalk, Bangor, Pa., assignor of one-half to Albert J. Dally, Bangor, Pa.

Application July 9, 1940, Serial No. 344,607

2 Claims. (Cl. 248—48.1)

The present invention relates to new and useful improvements in hangers for rainspouts or gutters and has for its primary object to provide a fastening clip for the section of the hanger adapted for securing the sections in adjusted position relative to each other.

A further object is to provide an adjustable fastening clip of this character having openings therein adapted to register with the vertically spaced openings in the overlapping edges of the sections of the hanger and providing a tapering pin adapted for wedging engagement in the openings to secure the sections on the hanger in the desired adjusted position.

A further object is to provide a device of this character of simple and practical construction, which is efficient and reliable in performance, which may be easily and quickly secured in position and removed therefrom without the use of special tools and which at the same time is otherwise well adapted for the purpose for which the same is intended.

Other objects and advantages reside in the details of construction and operation as more fully hereinafter described and claimed, reference being had to the accompanying drawing forming part hereof, wherein like numerals refer to like parts throughout and in which:

Figure 1 is a side elevational view of the hanger.

Figure 2 is a fragmentary vertical sectional view taken substantially on a line 2—2 of Fig. 1.

Figure 3 is a transverse sectional view taken on the line 3—3 of Fig. 1.

Figure 4 is a perspective view of the clip, and

Figure 5 is a perspective view of the locking pin.

Referring now to the drawing in detail wherein for the purpose of illustration I have disclosed a preferred embodiment of the invention the numeral 5 designates the shank portion of the hanger having the pair of attaching spikes 6 projecting angularly from the upper end thereof and the numeral 7 designates a hook portion of the hanger, the rear end of the hook having the rib 8 formed thereon adapted for seating in the channel 9 of the shank. The rib 8 is adapted for longitudinal adjustment relative to the shank and the rib and shank are provided with aligned openings 10 adapted for receiving a suitable anchoring member for securing the parts in vertically adjusted position.

Normally such anchoring member comprises a bolt and nut inserted through the opening 10, but since the hanger is usually placed in a restricted position it is difficult to manipulate the necessary tool for inserting and removing the bolt from the openings of the hanger.

Accordingly, in order to avoid such difficulty in securing the hanger in its desired adjusted position, I employ a U-shaped metal clip 11 within which the overlapping portions of the rib 8 of the hook 7 and the shank 5 are adapted for positioning, the clip also being formed with vertically spaced openings 12 adapted for aligning with the openings 10 and providing a tapering pin 13 adapted to be driven into one of the aligned openings for anchoring the parts in the desired adjusted position.

In order to remove the pin 13 it is only necessary that the smaller end thereof be tapped with a hammer or other suitable tool and the pin may then be withdrawn and the parts adjusted or replaced, if necessary.

It is believed the details of construction, manner of use and advantages of the device will be readily understood from the foregoing without further detailed explanation.

What is claimed is:

1. Quick applicable and removable fastening and adjusting means for complemental juxtaposed sections of a sectional eavestrough hanger, wherein said sections are characterized by longitudinally shiftable laterally separable members having interfitting key and keyway abutting surfaces, said members having adjustably registrable bolt holes; said means comprising an elongated channel-shaped assembling and retaining clip, the side flanges of said clip snugly embracing adjacent outer surfaces of said members to prevent lateral parting thereof, said flanges having longitudinally spaced pairs of opposed apertures selectively registrable in pairs with the bolt holes, and a tapered friction retained drive-pin passing through a selected pair of apertures and registered bolt holes and serving to separably assemble the parts.

2. In a spout hanger of the class described, the combination with a bar-like shank adapted to be suspended in upright position, and a hook member having a rear end extension opposed to one side of said shank for vertical sliding adjustment thereon into different set positions, said shank and extension having tongue and groove connections for guiding the extension during adjustment thereof, and means to establish the set positions of said extension and confine said shank and member against lateral separation comprising an elongated clip substantially U-shaped transversely and spanning said shank and member with its sides flat against the outer sides thereof and being vertically slidable endwise thereon, said shank and member having longitudinally spaced apertures therein, respectively, for registration selectively under adjustment of the member, said clip having longitudinally spaced pairs of similar apertures therein for registration, in pairs selectively with registered apertures in said shank and member, and a tapered pin for insertion selectively through registering apertures of said shank, member and clip.

JOHN I. GODSHALK.